United States Patent
Ku et al.

(10) Patent No.: US 8,885,375 B2
(45) Date of Patent: Nov. 11, 2014

(54) INVERTER FOR PREVENTING LEAK CURRENT

(75) Inventors: Chen-Wei Ku, Taoyuan Hsien (TW); Lei-Ming Lee, Taoyuan Hsien (TW); Ho Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 63 days.

(21) Appl. No.: 13/475,543

(22) Filed: May 18, 2012

(65) Prior Publication Data

US 2013/0016550 A1    Jan. 17, 2013

(30) Foreign Application Priority Data

Jul. 13, 2011  (TW) .............................. 100124851 A

(51) Int. Cl.
*H02M 7/5387* (2007.01)
*H02M 7/48* (2006.01)
*H02J 3/38* (2006.01)

(52) U.S. Cl.
CPC ................. *H02M 7/48* (2013.01); *H02J 3/383* (2013.01); *H02J 3/386* (2013.01); *Y02B 10/14* (2013.01); *Y02E 10/563* (2013.01); *Y02E 10/763* (2013.01)
USPC ........................................................ 363/132

(58) Field of Classification Search
CPC ......... H02M 7/48; H02M 7/53; H02M 7/537; H02M 7/5387
USPC .............. 363/17, 132; 307/151; 323/265, 168
See application file for complete search history.

(56) References Cited

FOREIGN PATENT DOCUMENTS

CN         102088193           6/2011
DE      102006010694 A1  *   9/2007
EP         2086102 A2    *   8/2009

* cited by examiner

*Primary Examiner* — Adolf Berhane
*Assistant Examiner* — Jye-June Lee
(74) *Attorney, Agent, or Firm* — Kirton McConkie; Evan R. Witt

(57) ABSTRACT

An inverter including a switch circuit for converting a DC power to output an AC voltage between a first output terminal and a second output terminal is provided. The switch circuit includes a first switch branch having a first switch element, a second switch element, and a third switch element; a second switch branch having a fourth switch element, a fifth switch element, and a sixth switch element; a first freewheeling unit connected to the first switch element, the second switch element, and the second output terminal for providing a freewheeling path between the second output terminal and the first switch element and the second switch element; and a second freewheeling unit connected to the fourth switch element and the fifth switch element and the first output terminal for providing a freewheeling path between the first output terminal and the fourth switch element and the fifth switch element.

20 Claims, 12 Drawing Sheets

INVERTER FOR PREVENTING LEAK CURRENT

FIELD OF THE INVENTION

The invention relates to an inverter, and more particularly to an inverter with improved conversion efficiency, reduced manufacturing cost, and subdued leak current.

BACKGROUND OF THE INVENTION

Nowadays, the major energy source for humankind comes from petroleum. The power or electricity required to drive a car or run a thermal power plant is supplied by burning petroleum. However, the heat and exhaust generated during the combustion of the petroleum not only can deteriorate the air quality, but can worsen the global warming effect. Besides, the yield of the petroleum will reach culmination in ten years and then will decline year by year. This means that the oil price (including the electricity tariff) will not be cheap anymore. Therefore, the energy crisis might come up eventually and cause global economic storm.

In view of the forthcoming global economic storm, renewable energy has been discovered to provide electricity or mechanical power efficiently and economically for households or industries. Thus far, the development of renewable energy has become an important energy policy for developed countries as a win-win strategy for power generation and environmental protection. Among various renewable energy, such as solar energy, wind energy, tidal energy, geothermal energy, and biowaste energy, the solar energy has become the mainstream as the solar energy generator has the advantages of high eco-friendliness, easiness of installation, matureness of commercial merchandising, and the overwhelming promotion lead by the country. Hence, solar energy has become a major choice for developed countries in pursuing distributed power supply system.

Referring to FIG. 1, in which the circuitry of an inverter according to the prior art is shown. As shown in FIG. 1, the inverter 1 is used in a solar grid-connected photovoltaic system, and thus the inverter 1 is also known as a photovoltaic inverter, or PV inverter. The inverter 1 is configured in a non-isolated and full-bridge topology, and includes an input filter 10, a full-bridge switch circuit 11, and an output filter 12. The input filter 10 is consisted of a first capacitor $C_1$ that receives a DC input voltage $V_{DC}$ generated by a solar cell and filters the DC input voltage $V_{DC}$. The full-bridge switch circuit 11 is connected to the output filter 12 and is consisted of switch elements $S_1$-$S_4$, in which the first switch element $S_1$ is connected in series with the second switch element $S_2$ and the third switch element $S_3$ is connected in series with the fourth switch element $S_4$ so as to form a full-bridge circuit with two bridge arms. The switch elements $S_1$-$S_4$ are controlled by a control unit (not shown) to turn on or off, thereby allowing the full-bridge switch circuit 11 to convert the filtered DC input voltage $V_{DC}$ into an AC modulating voltage $V_T$. The output filter 12 is connected to the full-bridge switch circuit 11 and is consisted of a first inductor $L_1$, a second inductor $L_2$, and a second filtering capacitor $C_2$. The output filter 12 is used to remove the high-frequency components of the AC modulating voltage $V_T$ to output an AC output voltage Vo to a grid G.

Generally, the switch elements $S_1$-$S_4$ of the full-bridge switch circuit 11 are configured to operate with the pulse-width modulation (PWM) fashion. More precisely, the switch elements $S_1$-$S_4$ of the full-bridge switch circuit 11 can operate under the bipolar switching mode or the unipolar switching mode. As the full-bridge switch circuit 11 is operating under the unipolar switching mode, only one bridge arm consisted of two switch elements are configured to conduct high-frequency switching operations, the AC modulating voltage $V_T$ is fluctuating between 0 and the positive DC input voltage $V_{DC}$ or fluctuating between 0 and the negative DC input voltage $-V_{DC}$. On the contrary, as the full-bridge switch circuit 11 is operating under the bipolar switching mode, the switch elements $S_1$-$S_4$ are configured to conduct high-frequency switching operations, the AC modulating voltage $V_T$ is fluctuating between the positive DC input voltage $V_{DC}$ and the negative DC input voltage $-V_{DC}$. Therefore, the switching loss of the full-bridge switch circuit 11 operating under the unipolar switching mode is less than the switching loss of the full-bridge switch circuit 11 operating under the bipolar switching mode. In other words, the full-bridge switch circuit 11 will have better conversion efficiency under the unipolar switching mode. However, as a parasite capacitance $C_p$ is existed between the solar cell which generates the DC input voltage $V_{DC}$ and the ground terminal, as shown in FIG. 1, the modulating voltage $V_T$ will have high-frequency components when the full-bridge switch circuit 11 is operating under the unipolar switching mode. Thus, the relative voltage drop between the positive output terminal of the switch circuit 11 and a specific node within the inverter 1 and the relative voltage drop between the negative output terminal of the switch circuit 11 and the specific node within the inverter 1 can not be set to maintain their total average value at any switching point at a constant value. This would result in a significant voltage drop across the parasite capacitance $C_p$ and cause leak current, thereby endangering human users and equipment.

Referring to FIG. 2, in which a different circuitry of the inverter according to the prior art is shown. In FIG. 2, the inverter 2 is configured as a neutral point clamped inverter (NPC inverter). The inverter 2 includes an input filter 20, a switch circuit 21, and an output filter 22. The connecting relationship between the input filter 20 and the output filter 22 are similar to the connecting relationship between the input filter 10 and the output filter 12 of FIG. 1. Thus, the details in connection with the input filter 20 and the output filter 22 will not be given herein. The switch circuit 21 is consisted of switch elements $S_1$-$S_{12}$, in which the switch elements $S_1$-$S_6$ form a first switch branch and switch elements $S_7$-$S_{12}$ form a second switch branch.

When the inverter 2 is applied to a solar grid-connected photovoltaic system, the parasite capacitance $C_p$ within the solar cell will not undergo a significant voltage drop due to the switching operations of the switch elements $S_1$-$S_{12}$. Thus, the leak current can be avoided. However, as the inverter 2 includes twelve switch elements, the manufacturing cost of the inverter 2 is very high. More disadvantageously, the switching loss of the inverter 2 will be aggravated as the inverter 2 uses twelve switch elements to carry out switching operations. This would deteriorate the conversion efficiency of the inverter 2.

Thus, the applicants endeavor to develop an inverter with a better conversion efficiency and lower leak current.

SUMMARY OF THE INVENTION

An object of the invention is to provide an inverter for addressing the problem of low conversion efficiency and high leak current when the conventional inverter is applied to a solar grid-connected photovoltaic system.

To this end, the invention provides an inverter, including a switch circuit configured to receive a DC power and convert the DC power into an AC modulating voltage for output between a first output terminal and a second output terminal. The switch circuit includes a first switch branch including a first switch element, a second switch element, and a third switch element connected in series with each other, wherein the second switch element and the third switch element are connected to the first output terminal; a second switch branch connected in parallel with the first switch branch, and including a fourth switch element, a fifth switch element, and a sixth switch element connected in series with each other, wherein the fifth switch element and the sixth switch element are connected to the second output terminal; a first freewheeling unit having one end connected between the first switch element and the second switch element, and the other end connected to the second output terminal; and a second freewheeling unit having one end connected between the fourth switch element and the fifth switch element, and the other end connected to the first output terminal. The first switch element and the sixth switch element are turned on and off simultaneously and continuously and the second switch element is turned on during positive half-cycles, and the third switch element and the fourth switch element are turned on and off simultaneously and continuously and the fifth switch element is turned on during negative half-cycles.

Now the foregoing and other features and advantages of the invention will be best understood through the following descriptions with reference to the accompanying drawings, in which:

DESCRIPTION OF THE PREFERRED EMBODIMENT

Several exemplary embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 3:
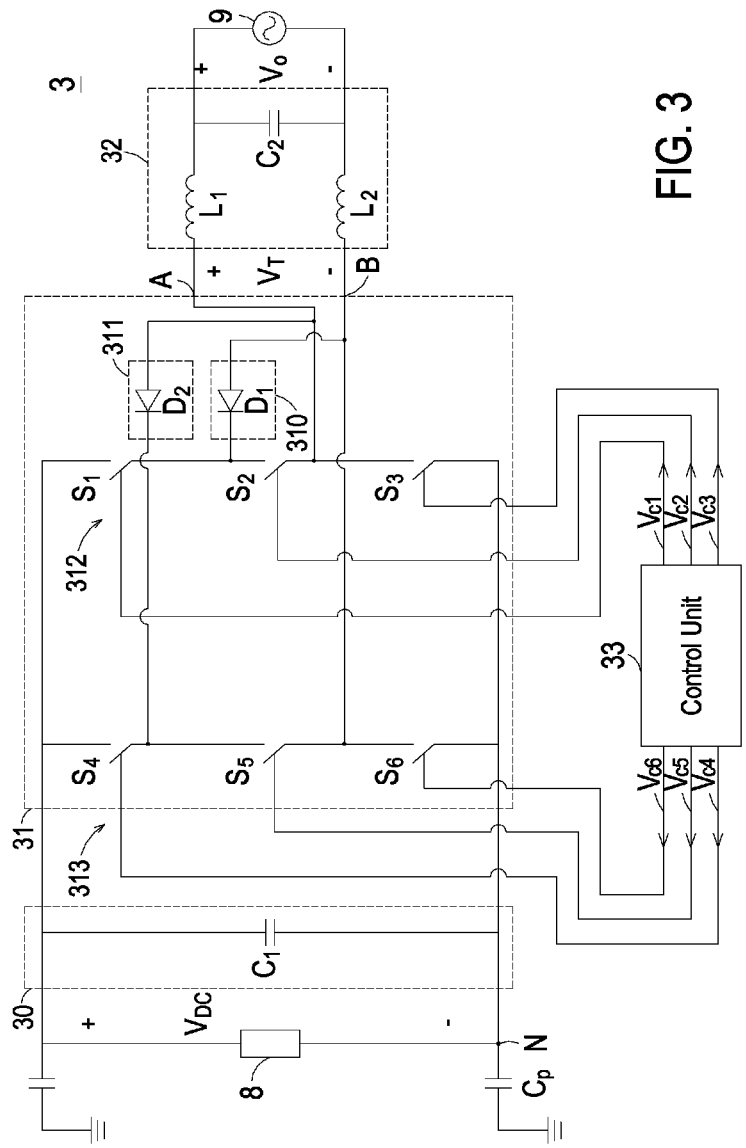
FIG. 3 shows the circuitry of an inverter according to an embodiment of the invention.

Referring to FIG. 3, in which the circuitry of an inverter according to an embodiment of the invention is shown. As shown in FIG. 3, the inverter 3 may be applied to a solar grid-connected photovoltaic system and is a non-isolated circuit. The inverter 3 is used to receive a DC input voltage $V_{DC}$ from a DC device 8 such as a solar cell, and convert the DC input voltage $V_{DC}$ into an AC output voltage $V_o$. The AC output voltage $V_o$ is supplied to an AC load 9 such as an AC appliance or an AC network system.

The inverter 3 includes an input filter 30, a switch circuit 31, an output filter 32, and a control unit 33. The input filter 30 is respectively connected to the positive terminal and negative terminal of the DC device 8 for receiving the DC input voltage $V_{DC}$ and filtering the DC input voltage $V_{DC}$. In this embodiment, the input filter 30 may include a first capacitor $C_1$.

The switch circuit 31 is connected to the input filter 30 and includes switch elements $S_1$-$S_6$, a first freewheeling unit 310, and a second freewheeling unit 311. The switch circuit 31 is used to convert the filtered DC input voltage $V_{DC}$ by means of the switching operations of the switch elements $S_1$-$S_6$, the first freewheeling unit 310, and the second freewheeling unit 311, thereby outputting an AC modulating voltage $V_T$ between a first output terminal A and a second output terminal B.

In this embodiment, the first switch element $S_1$, the second switch element $S_2$, and the third switch element $S_3$ are connected in series with each other and form a first switch branch 312. One end of the first switch element $S_1$ is connected to the positive terminal of the DC device 8 and the positive terminal of the input filter 30. One end of the third switch element $S_3$ is connected to the negative terminal of the DC device 8 and the negative terminal of the input filter 30. Also, the second switch element $S_2$ and the third switch element $S_3$ are connected to the first output terminal A. The fourth switch element $S_4$, the fifth switch element $S_5$, and the sixth switch element $S_6$ are connected in series with each other and form a second switch branch 313 which is connected in parallel with the first switch branch 312. One end of the fourth switch element $S_4$ is connected to the positive terminal of the DC device 8 and the positive terminal of the input filter 30. One end of the sixth switch element $S_6$ is connected to the negative terminal of the DC device 8 and the negative terminal of the input filter 30. Also, the fifth switch element $S_5$ and the sixth switch element $S_6$ are connected to the second output terminal B.

One end of the first freewheeling unit 310 is connected between the first switch element $S_1$ and the second switch element $S_2$. The other end of the first freewheeling unit 310 is connected to the second output terminal B. The first freewheeling unit 310 is used to provide a freewheeling path between the second output terminal B and the first switch element $S_1$ and the second switch element $S_2$. One end of the second freewheeling unit 311 is connected between the fourth switch element $S_4$ and the fifth switch element $S_5$. The other end of the second freewheeling unit 311 is connected to the first output terminal A. The second freewheeling unit 311 is used to provide another freewheeling path between the first output terminal A and the fourth switch element $S_4$ and the fifth switch element $S_5$.

In this embodiment, the first freewheeling unit 310 is consisted of a first freewheeling diode $D_1$, and the second freewheeling unit 311 is consisted of a second freewheeling diode $D_2$. The cathode of the first freewheeling diode $D_1$ is connected between the first switch element $S_1$ and the second switch element $S_2$. The anode of the first freewheeling diode $D_1$ is connected to the second output terminal B. The cathode of the second freewheeling diode $D_2$ is connected between the fourth switch element $S_4$ and the fifth switch element $S_5$. The anode of the second freewheeling diode $D_2$ is connected to the first output terminal A.

The control unit 33 is connected to the control terminals of the switch elements $S_1$-$S_6$. The control unit 33 is used to generate PWM-based control signals $V_{c1}$-$V_{c6}$ for controlling the switch elements $S_1$-$S_6$ to turn on or off.

The output filter 32 is connected to the first output terminal A and the second output terminal B of the switch circuit 31. Also, the output filter 32 is connected to the load 9 for receiving the AC modulating voltage $V_T$ and removing the high-frequency components of the AC modulating voltage $V_T$, thereby outputting the AC output voltage $V_o$ to the AC load 9. In this embodiment, the output filter 32 includes a first inductor $L_1$, a second inductor $L_2$, and a second capacitor $C_2$. One end of the first inductor $L_1$ is connected to the first output terminal A. One end of the second inductor $L_2$ is connected to the second output terminal B. The second capacitor $C_2$ is connected to the first inductor $L_1$, the second inductor $L_2$, and the AC load 9.

Figure 4A:
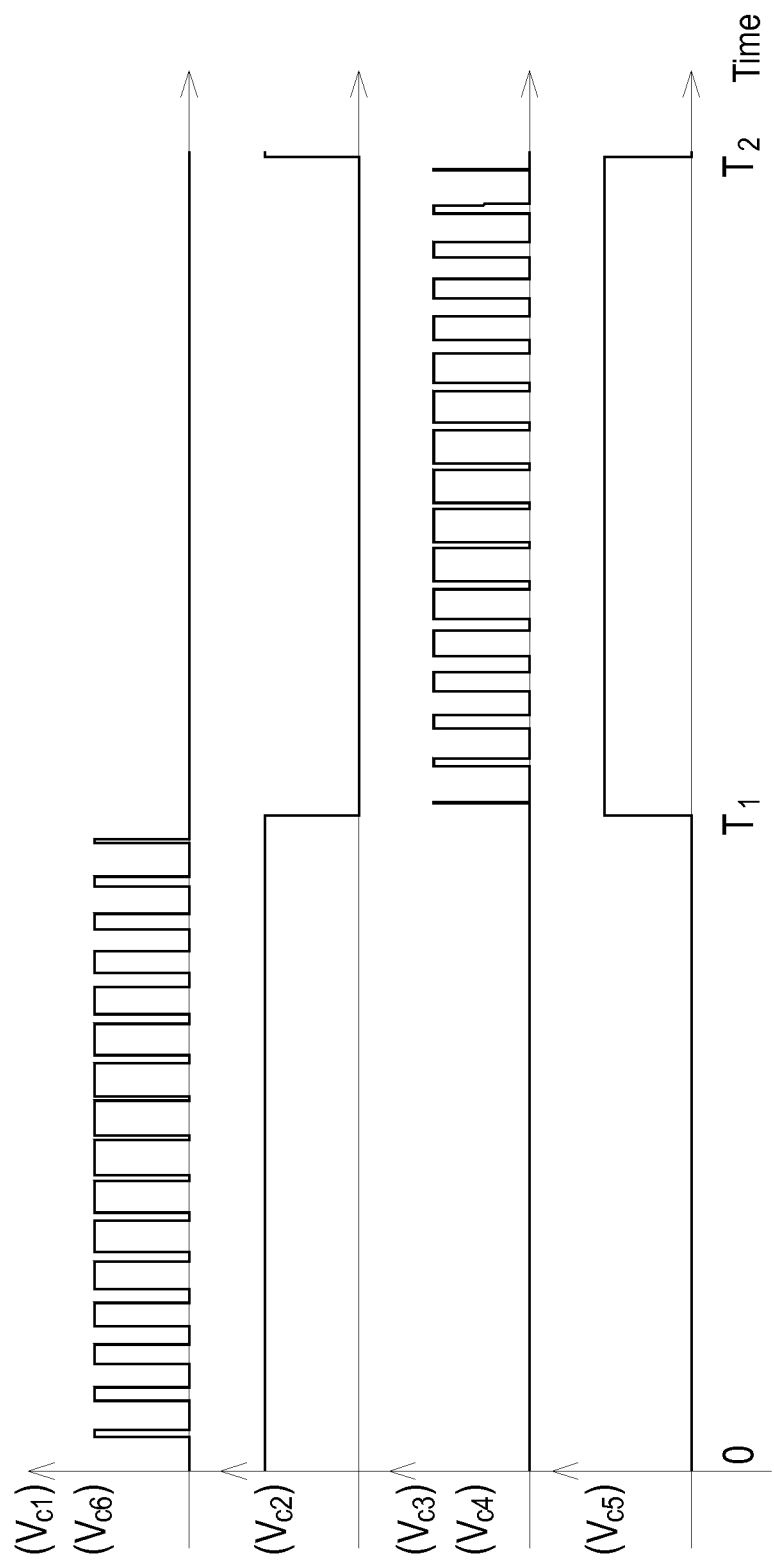
FIG. 4A shows the waveform diagrams of the control signals used within the circuitry of FIG. 3.
Figure 4B:
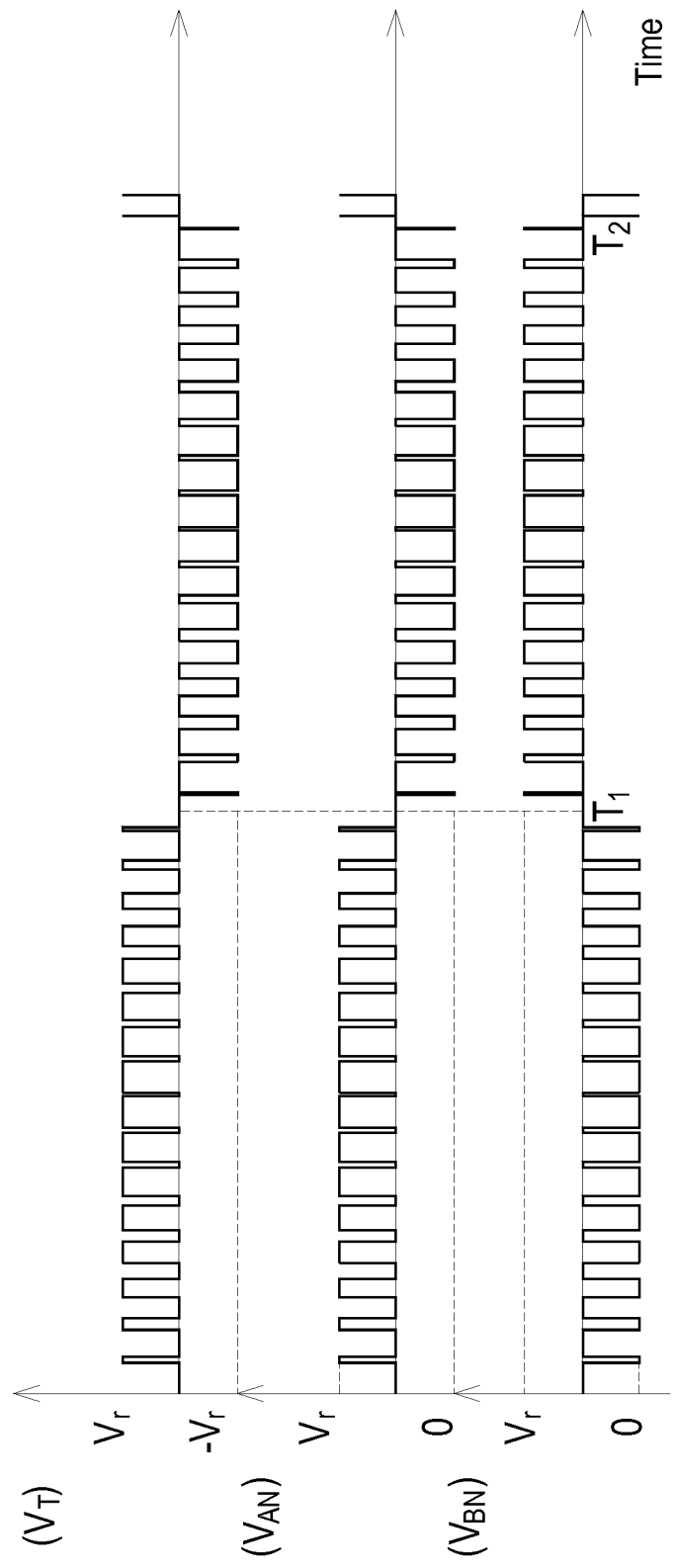
FIG. 4B shows the waveform diagrams of the AC modulating voltage used within the circuitry of FIG. 3.

Next, the operation of the inventive inverter 3 will be illustrated. Referring to FIGS. 4A and 4B and FIG. 3, in which FIG. 4A shows the waveform diagrams of the control signals used within the circuitry of FIG. 3 and FIG. 4B shows the waveform diagrams of the AC modulating voltage used within the circuitry of FIG. 3. As shown in FIGS. 3, 4A and 4B, during the positive half-cycle, e.g. during the point 0 and the first point $T_1$, the first control signal $V_{c1}$ and the sixth control signal $V_{c6}$ are fluctuated in a PWM fashion. That is, the first control signal $V_{c1}$ and the sixth control signal $V_{c6}$ are alternated between the disabled state and the enabled state. Therefore, the first switch element $S_1$ and the sixth switch element $S_6$ are turned on and off simultaneously and continuously. In addition, the third control signal $V_{c3}$, the fourth control signal $V_{c4}$, and the fifth control signal $V_{c5}$ are kept in the disabled state. Hence, the third switch element $S_3$, the fourth switch element $S_4$, and the fifth switch element $S_5$ are turned off. Furthermore, the second control signal $V_{c2}$ is kept in the enabled state, and thus the second switch element $S_2$ is turned on.

Accordingly, as the first switch element $S_1$ and the sixth switch element $S_6$ are both turned on during the positive half-cycle, the current outputted by the DC device 8 will flow through the first switch element $S_1$, the second switch element $S_2$, the first inductor $L_1$, the second capacitor $C_2$, the second inductor $L_2$, and the sixth switch element $S_6$ in sequence. Therefore, the DC power outputted by the DC device 8 can be filtered and converted into an AC power so as to be supplied to the AC load 9. Meanwhile, the first inductor $L_1$ and the second inductor $L_2$ will store energy. As the first switch element $S_1$ and the sixth switch element $S_6$ are both turned off during the positive half-cycle, the energy stored in the first inductor $L_1$ and the second inductor $L_2$ will flow through the first freewheeling unit 310 and the second switch element $S_2$ which is turned on. Therefore, the AC load 9 can continuously receive the energy outputted by the DC device 8.

During the negative half-cycle, e.g. during the first point T1 and the second point T2, the third control signal $V_{c3}$ and the fourth control signal $V_{c4}$ are fluctuated in a PWM fashion. That is, the third control signal $V_{c3}$ and the fourth control signal $V_{c4}$ are alternated between the disabled state and the enabled state. Therefore, the third switch element $S_3$ and the fourth switch element $S_4$ are turned on and off simultaneously and continuously. In addition, the first control signal $V_{c1}$, the second control signal $V_{c2}$, and the sixth control signal $V_{c6}$ are transitioned to the disabled state. Therefore, the first switch element $S_1$, the second switch element $S_2$, and the sixth switch element $S_6$ are turned off. Furthermore, the fifth control signal $V_{c5}$ is transitioned to the enabled state. Therefore, the fifth switch element $S_5$ is turned on.

Accordingly, as the third switch element $S_3$ and the fourth switch element $S_4$ are both turned on during the negative half-cycle, the current outputted by the DC device 8 will flow through the fourth switch element $S_4$, the fifth switch element $S_5$, the second inductor $L_2$, the second capacitor $C_2$, the first inductor $L_1$, and the third switch element $S_3$ in sequence. Therefore, the DC power outputted by the DC device 8 can be filtered and converted into an AC power so as to be supplied to the AC load 9. Meanwhile, the first inductor $L_1$ and the second inductor $L_2$ will store energy. As the third switch element $S_3$ and the fourth switch element $S_4$ are both turned off during the negative half-cycle, the energy stored in the first inductor $L_1$ and the second inductor $L_2$ will flow through the second freewheeling unit 311 and the fifth switch element $S_5$ which is turned on. Therefore, the AC load 9 can continuously receive the energy outputted by the DC device 8.

Figure 1:
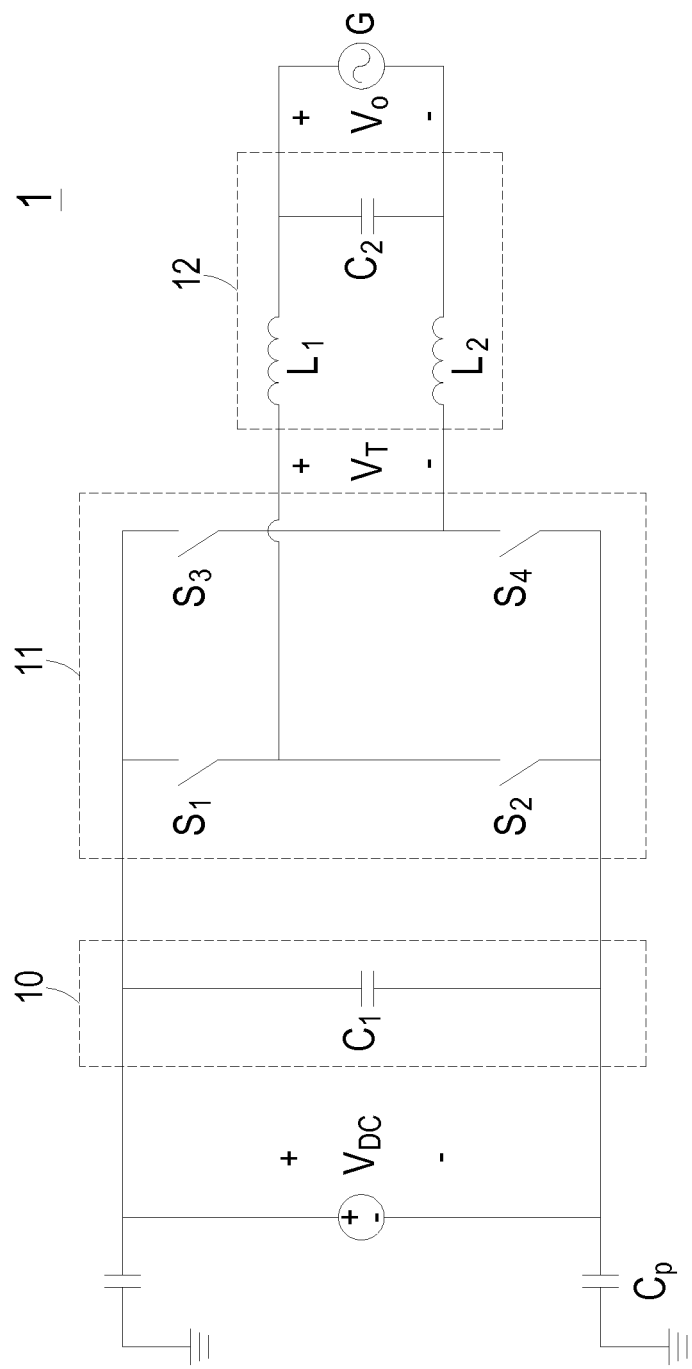
FIG. 1 shows the circuitry of an inverter according to the prior art.
Figure 2:
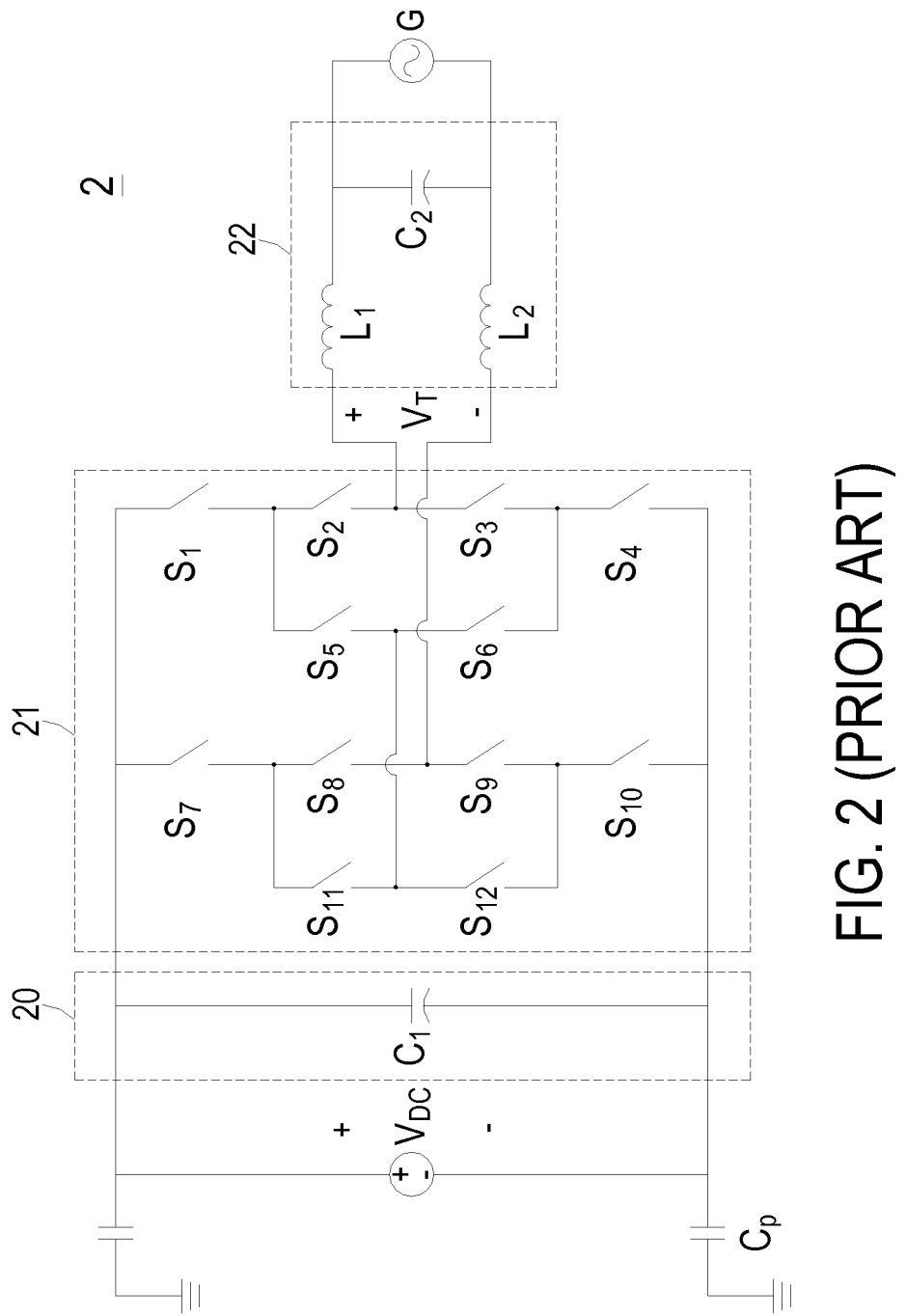
FIG. 2 shows a different circuitry of the inverter according to the prior art.

Referring to FIG. 4B, with the placement of the switch elements $S_1$-$S_6$, the first freewheeling unit 310, and the second freewheeling unit 311, the AC modulating voltage $V_T$ outputted by the switch circuit 31 is fluctuated between 0 and a positive predetermined value $V_r$ during the positive half-cycle and fluctuated between 0 and a negative predetermined value $-V_r$ during the negative half-cycle. Therefore, the practical operation of the switch circuit 31 is analogous to the operation of the full-bridge switch circuit 11 operating under the unipolar switching mode of FIG. 1. Hence, the inventive inverter 3 can reduce the switching loss of the internal switch elements $S_1$-$S_6$, thereby enhancing the conversion efficiency. Also, the relative voltage drop between first output terminal A and a predetermined node within the inverter and the relative voltage drop between first output terminal B and the predetermined node within the inverter, such as the first relative voltage drop $V_{AN}$ between the first output terminal A and the node N connecting to the parasite capacitance $C_p$ shown in FIG. 3 and the second relative voltage drop $V_{BN}$ between the second output terminal B and the node N, are set to maintain their total average value at any switching point at a constant value. Hence, the parasite capacitance $C_p$ will not induce a significant voltage drop. In this manner, the occurrence of the leak current will be subdued, and risk borne by the human user and equipment will be lessened. More advantageously, compared to the conventional inverter of FIG. 2, the inventive inverter 3 only uses six switch elements and two freewheeling units to carry out switching operations. Thus, the manufacturing cost of the inverter 3 is reduced and the switching loss of the inverter 3 is lessened. Hence, the conversion efficiency of the inverter 3 is elevated.

In this embodiment, the switch elements $S_1$-$S_6$ may be consisted of MOSFETs. In the foregoing embodiments, the first control signal $V_{c1}$, the third control signal $V_{c3}$, the fourth control signal $V_{c4}$, and the sixth control signal $V_{c6}$ are high-frequency PWM signals, and the second control signal $V_{c2}$ and the fifth control signal $V_{c5}$ are low-frequency PWM signals.

Figure 5A:
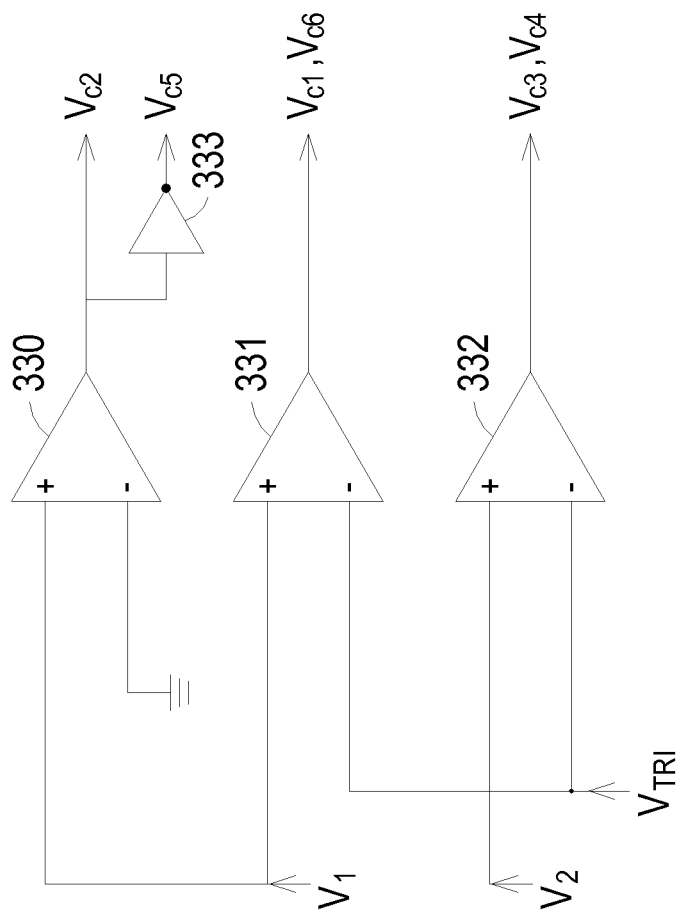
FIG. 5A shows the circuitry of the control unit of FIG. 3.
Figure 5B:
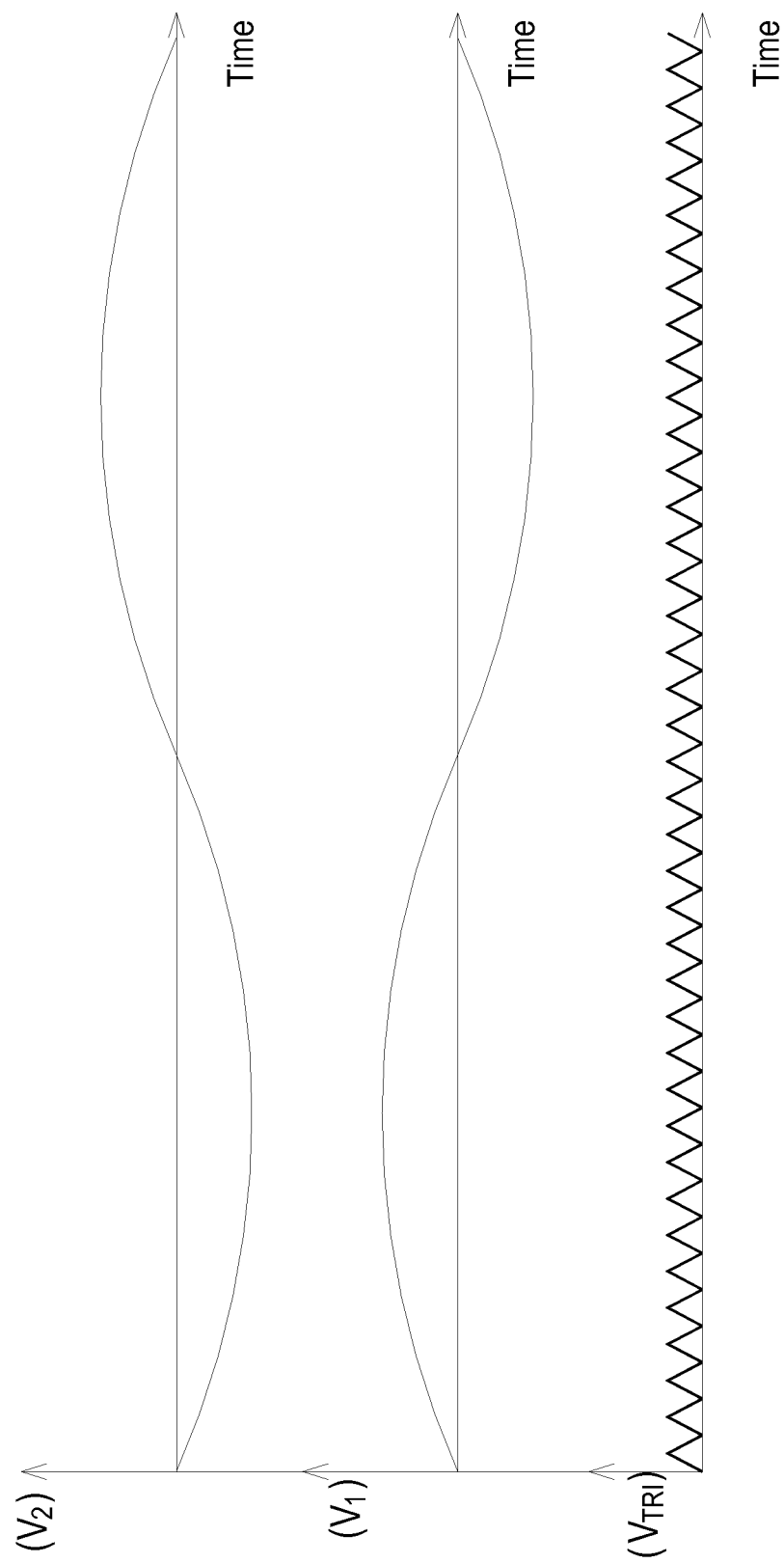
FIG. 5B shows the waveform diagrams of the control signals used within the circuitry of FIG. 5A.

Next, the circuitry of the control unit 33 of FIG. 3 will be described. Referring to FIG. 3 and FIGS. 5A and 5B, in which FIG. 5A shows the circuitry of the control unit of FIG. 3 and FIG. 5B shows the waveform diagrams of the control signals used within the circuitry of FIG. 5A. The control unit 33 includes a first comparator 330, a second comparator 331, a third comparator 332, and a NOT gate 333. The positive input terminal of the first comparator 330 is used to receive a first sinusoidal signal $V_1$, and the negative input terminal of the first comparator 330 is grounded. The output terminal of the first comparator 330 is connected to the control terminal of the second switch element $S_2$ for outputting the second control signal $V_{c2}$. The positive input terminal of the second comparator 331 is used to receive the first sinusoidal signal $V_1$, and the negative input terminal of the second comparator 331 is used to receive a triangular signal $V_{TRI}$. The output terminal of the second comparator 331 is connected to the control terminal of the first switch element $S_1$ and the control terminal of the sixth switch element $S_6$, and is used to output the first control signal $V_{c1}$ and the sixth control signal $V_{c6}$. The positive input terminal of the third comparator 332 is used to receive a second sinusoidal signal $V_2$, which has a phase difference of 180 degree with the first sinusoidal signal $V_1$. The negative input terminal of the third comparator 332 is used to receive the triangular signal $V_{TRI}$. The output terminal of the third comparator 332 is connected to the control terminal of the third switch element $S_3$ and the control terminal of the fourth switch element $S_4$, and is used to output the third control signal $V_{c3}$ and the fourth control signal $V_{c4}$. The input terminal of the NOT gate 333 is connected to the output terminal of the first comparator 330, and the output terminal of the NOT gate 333 is connected to the control terminal of the fifth switch element $S_5$. The NOT gate 333 is used to invert the second control signal $V_{c2}$, thereby outputting the fifth control signal $V_{c5}$.

Figure 6A:
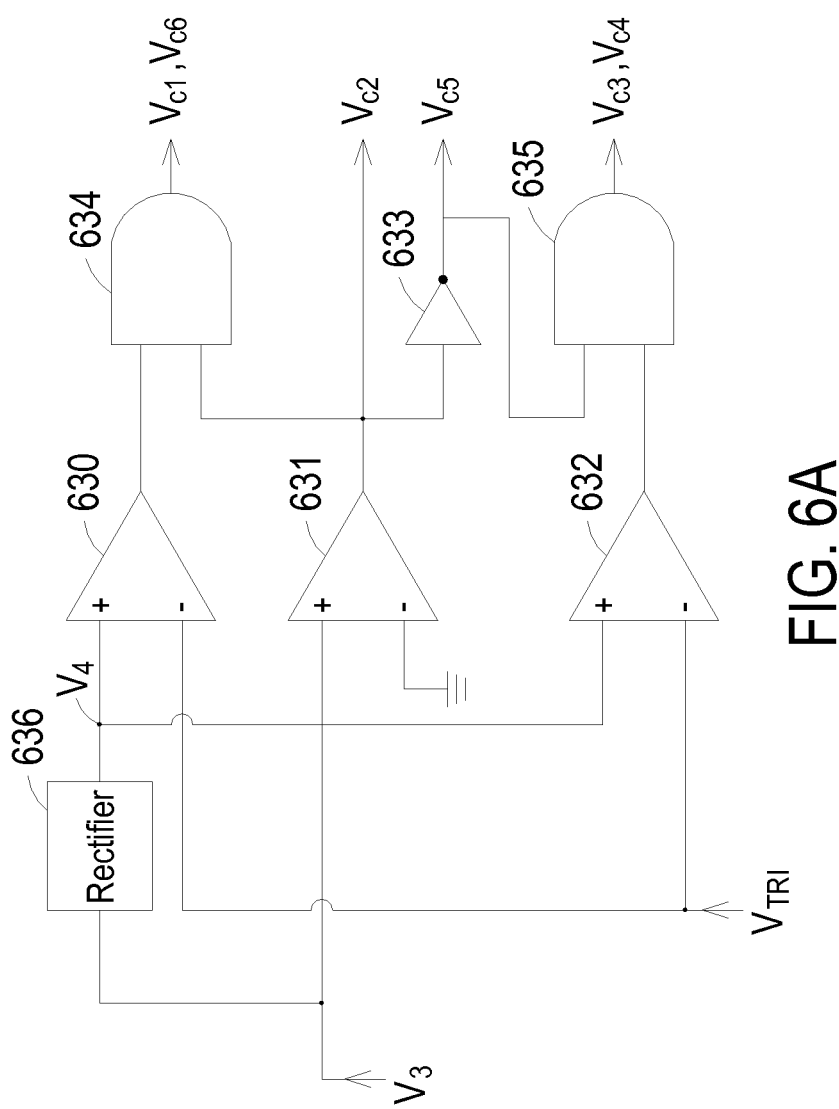
FIG. 6A shows a modified circuitry of the control unit of FIG. 3.
Figure 6B:
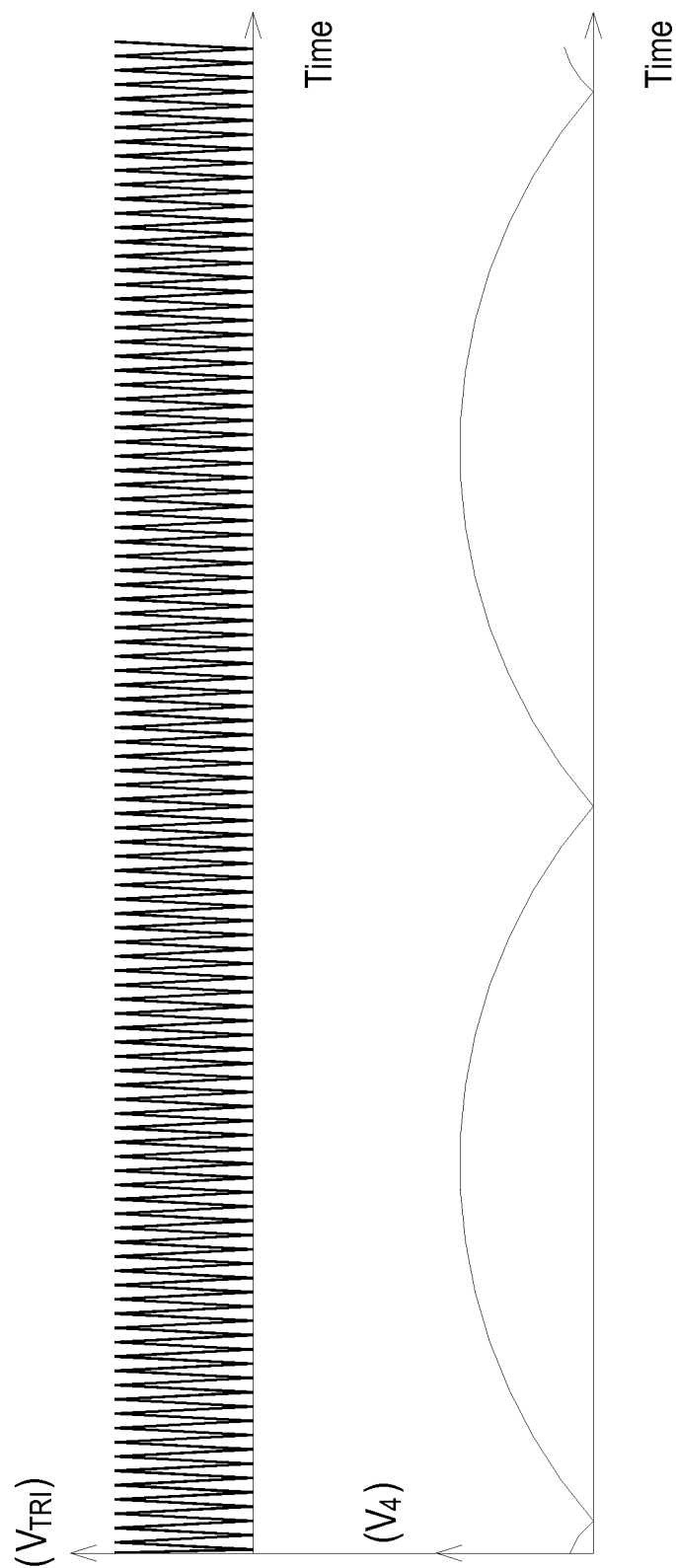
FIG. 6B shows the waveform diagrams of the control signals used within the circuitry of FIG. 6A.

Certainly, the circuitry of the control unit 33 may not be limited to the precise form disclosed herein. Referring to FIG. 6A and FIG. 6B, in which FIG. 6A shows a modified circuitry of the control unit 33 and FIG. 6B shows the waveform diagrams of the control signals used within the circuitry of FIG. 6A. In FIG. 6A, the control unit 33 includes a first comparator 630, a second comparator 631, a third comparator 632, a first NOT gate 633, a first AND gate 634, a second AND gate 635, and a rectifier 636. The rectifier 636 is used to receive a sinusoidal signal $V_3$ and rectify the sinusoidal signal $V_3$ into a rectified sinusoidal signal $V_4$.

The positive input terminal of the first comparator 630 is connected to the rectifier 636 and is used to receive the rectified sinusoidal signal $V_4$. The negative terminal of the first comparator 630 is used to receive the triangular signal $V_{TRI}$. The output terminal of the first comparator 630 is connected to a first input terminal of the first AND gate 634. The positive input terminal of the second comparator 631 is used to receive the sinusoidal signal $V_3$. The negative input terminal of the second comparator 631 is grounded. The output terminal of the second comparator 631 is connected to the control terminal of the second switch element $S_2$, and is used to output the second control signal $V_{c2}$. The positive input terminal of the third comparator 632 is connected to the rectifier 636, and is used to receive the rectified sinusoidal signal $V_4$. The negative terminal of the third comparator 632 is used to receive the triangular signal $V_{TRI}$. The output terminal of the third comparator 632 is connected to a first input terminal of the second AND gate 635.

The input terminal of the first NOT gate 633 is connected to the output terminal of the second comparator 631, and is used to receive the second control signal $V_{c2}$. The output terminal of the first NOT gate 633 is connected to the fifth switch element $S_5$. The first NOT gate 633 is used to invert the second control signal $V_{c2}$, thereby outputting the fifth control signal $V_{c5}$ at the output terminal of the first NOT gate 633. The second input terminal of the first AND gate 634 is connected to the output terminal of the second comparator 631, and is used to receive the second control signal $V_{c2}$. The output terminal of the first AND gate 634 is connected to the control terminal of the first switch element $S_1$ and the control terminal of the sixth switch element $S_6$, and is used to output the first control signal $V_{c1}$ and the sixth control signal $V_{c6}$. The second input terminal of the second AND gate 635 is connected to the output terminal of the first NOT gate 633, and is used to receive the fifth control signal $V_{c5}$. The output terminal of the second AND gate 635 is connected to the control terminal of the third switch element $S_3$ and the control terminal of the fourth switch element $S_4$, and is used to output the third control signal $V_{c3}$ and the fourth control signal $V_{c4}$.

Figure 7:
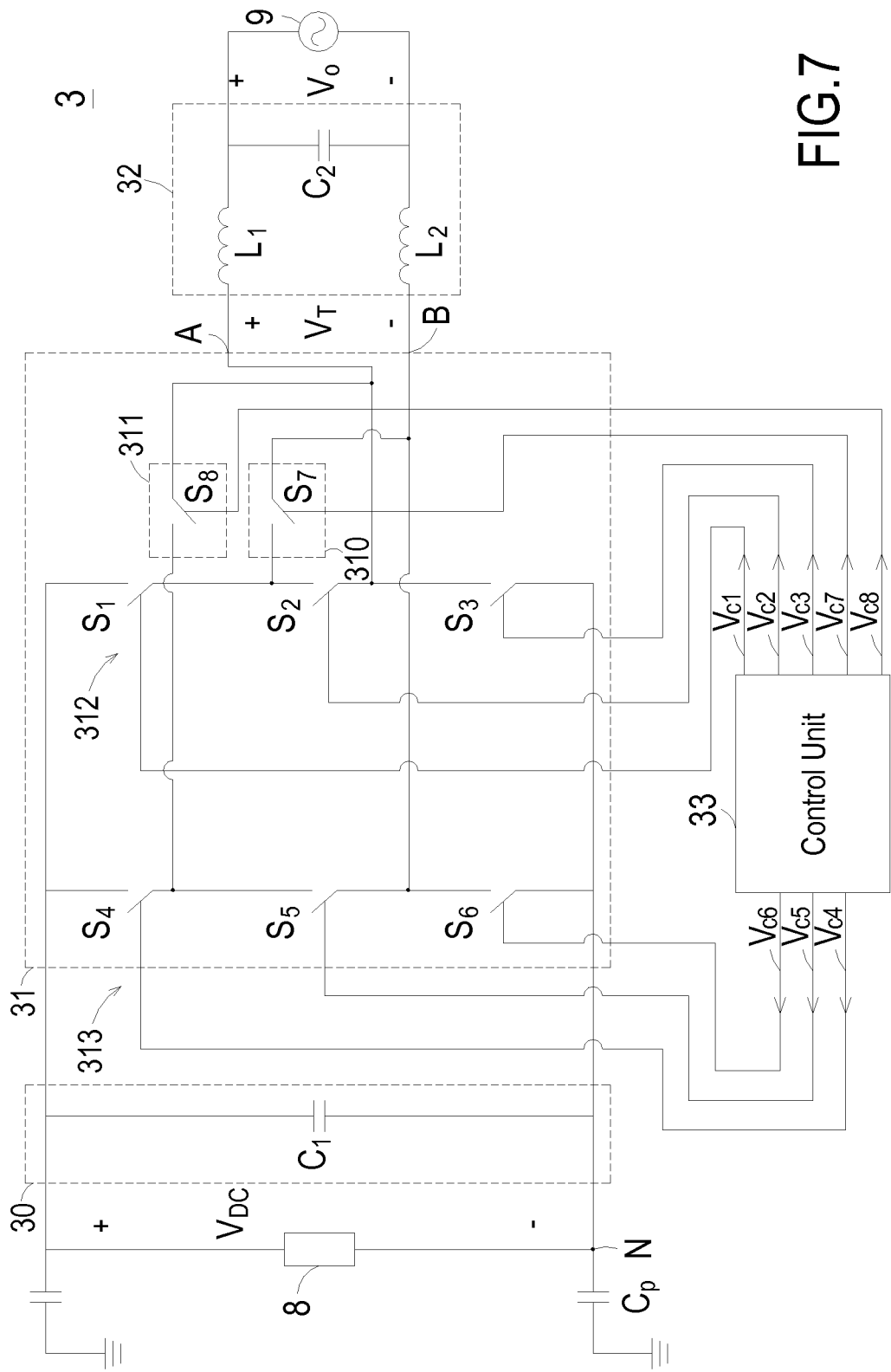
FIG. 7 is a modified circuitry of the inverter of FIG. 3.
Figure 8A:
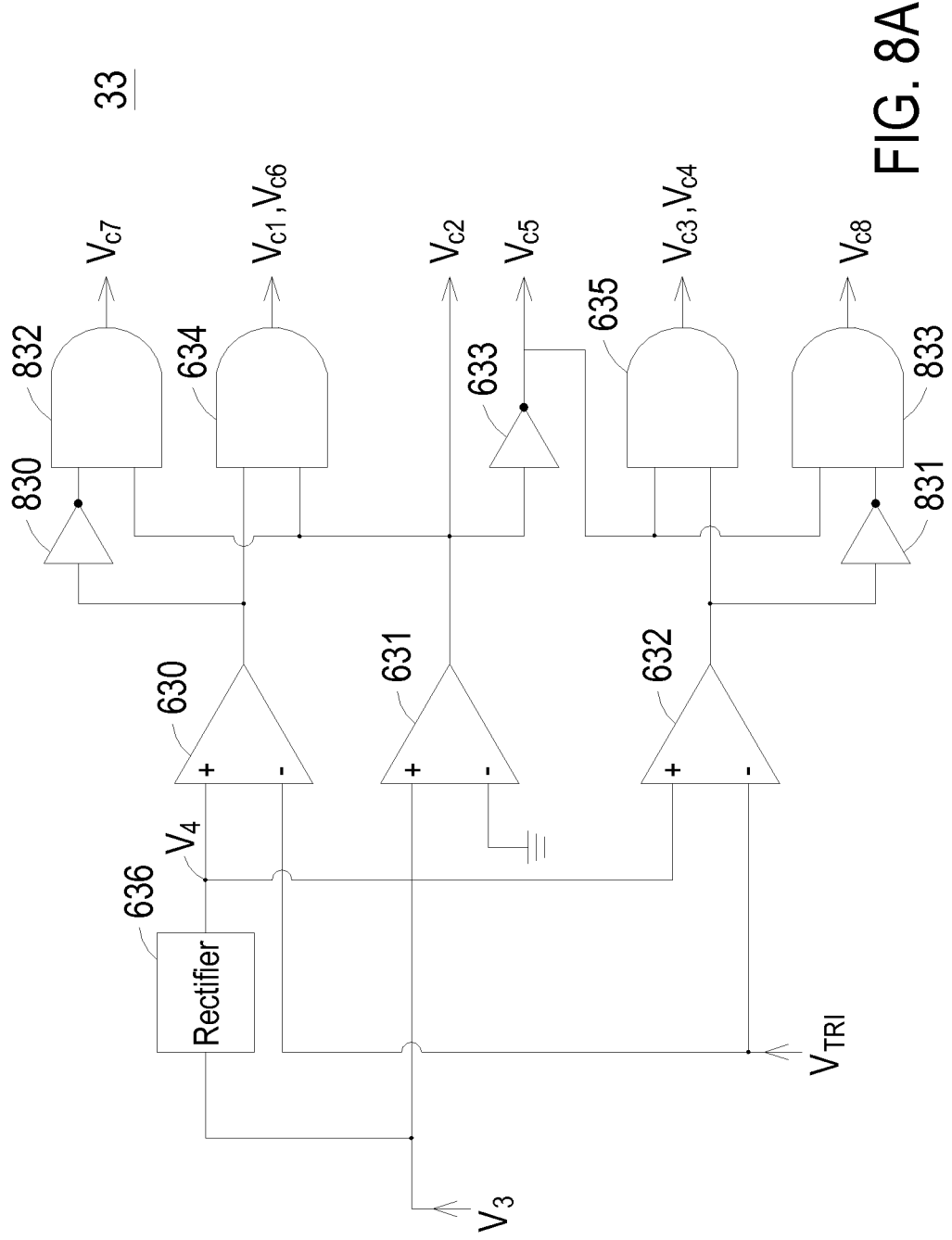
FIG. 8A shows the circuitry of the control unit shown in FIG. 7.
Figure 8B:
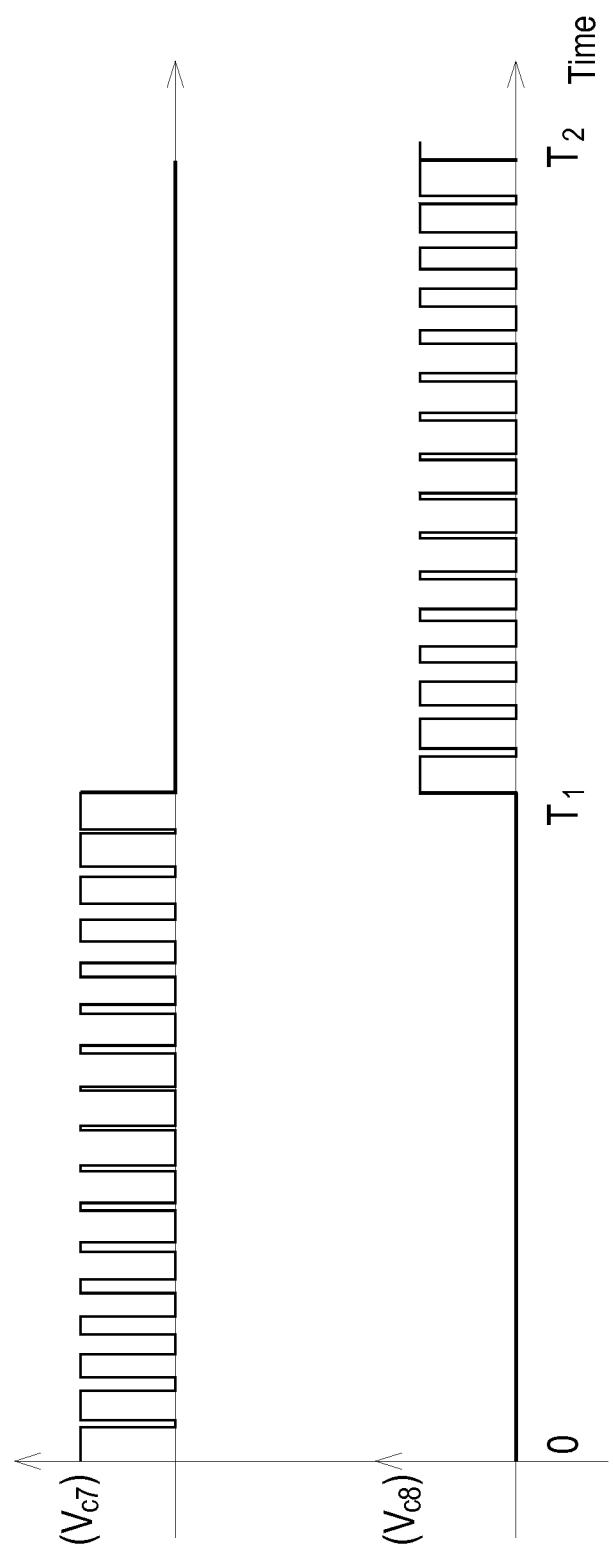
FIG. 8B shows the waveform diagrams of the control signals used within the control unit of FIG. 8A.

Referring to FIG. 7 and FIGS. 8A and 8B, in which FIG. 7 is a modified circuitry of the inverter of FIG. 3, FIG. 8A shows the circuitry of the control unit shown in FIG. 7, and FIG. 8B shows the waveform diagrams of the control signals used within the control unit of FIG. 8A. In this embodiment, the first freewheeling unit 310 and the second freewheeling unit 311 shown in FIG. 3 are replaced with a seventh switch element $S_7$ and an eighth switch element $S_8$, respectively. Moreover, the seventh switch element $S_7$ and the eighth switch element $S_8$ are made up of MOSFETs. Also, the control unit 33 is respectively connected to the control terminal of the seventh switch element $S_7$ and the control terminal of the eighth switch element $S_8$, thereby outputting a seventh control signal $V_{c7}$ and an eighth control signal $V_{c8}$ to control the switching operations of the seventh switch element $S_7$ and the eighth switch element $S_8$, respectively.

Furthermore, compared to the control unit 33 of FIG. 6A, the control unit 33 of FIG. 8A additionally includes a second NOT gate 830, a third NOT gate 831, a third AND gate 832, a fourth AND gate 833. The input terminal of the second NOT gate 830 is connected to the output terminal of the first comparator 630, and the output terminal of the second NOT gate 830 is connected to a first input terminal of the third AND gate 832. The input terminal of the third NOT gate 831 is connected to the output terminal of the third comparator 632, and the output terminal of the third NOT gate 831 is connected to a first input terminal of the fourth AND gate 833. The second input terminal of the third AND gate 832 is connected to the output terminal of the second comparator 631, and is used to receive the second control signal $V_{c2}$. The output terminal of the third AND gate 832 is connected to the control terminal of the seventh switch element $S_7$, and is used to output a seventh control signal $V_{c7}$. The second input terminal of the fourth AND gate 833 is connected to the output terminal of the first NOT gate 633, and is used to receive the fifth control signal $V_{c5}$. The output terminal of the fourth AND gate 833 is connected to the control terminal of the eighth switch element $S_8$, and is used to output an eighth control signal $V_{c8}$.

During the positive half-cycle, e.g. during the point of 0 and the first point $T_1$, the seventh control signal $V_{c7}$ is fluctuated in a PWM fashion with a high frequency. Also, the status of the seventh control signal $V_{c7}$ is opposite to the status of the first control signal $V_{c1}$ and the status of the sixth control signal $V_{c6}$. Hence, when the first switch element $S_1$ and the sixth switch element $S_6$ are turned on, the seventh switch element $S_7$ is turned off. On the contrary, when the first switch element $S_1$ and the sixth switch element $S_6$ are turned off, the seventh switch element $S_7$ is turned on. Thus, a freewheeling path is provided to allow the energy stored in the first inductor $L_1$ and the second inductor $L_2$ to release. The eighth control signal $V_{c8}$ is kept in the disabled state.

During the negative half-cycle, e.g. during the first point $T_1$ and the second point $T_2$, the eighth control signal $V_{c8}$ is fluctuated in a PWM fashion with a high frequency. Also, the status of the eighth control signal $V_{c8}$ is opposite to the status of the third control signal $V_{c3}$ and the status of the fourth control signal $V_{c4}$. Hence, when the third switch element $S_3$ and the fourth switch element $S_4$ are turned on, the eighth switch element $S_8$ is turned off. On the contrary, when the third switch element $S_3$ and the fourth switch element $S_4$ are turned off, the eighth switch element $S_8$ is turned on. Thus, a freewheeling path is provided to allow the energy stored in the first inductor $L_1$ and the second inductor $L_2$ to release. The seventh control signal $V_{c7}$ is kept in the disabled state.

In conclusion, the inventive inverter can enhance the conversion efficiency, reduce the manufacturing cost, prevent the occurrence of the leak current, and lessen the risk borne by the human user and equipment by the placement of the switch elements $S_1$-$S_6$, the first freewheeling unit 310, and the second freewheeling unit 311.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. An inverter for converting a DC power into an AC power, comprising:
   a switch circuit configured to receive a DC power and convert the DC power into an AC modulating voltage for output between a first output terminal and a second output terminal, the switch circuit comprising:
   a first switch branch including a first switch element, a second switch element, and a third switch element connected in series with each other, wherein the second switch element and the third switch element are connected to the first output terminal, and the second switch element is serially connected between the first switch element and the third switch element;
   a second switch branch connected in parallel with the first switch branch, and including a fourth switch element, a fifth switch element, and a sixth switch element connected in series with each other, wherein the fifth switch element and the sixth switch element are connected to the second output terminal, and the fifth switch element is serially connected between the fourth switch element and the sixth switch element;
   a first freewheeling unit having one end connected between the first switch element and the second switch element, and another end connected to the second output terminal; and
   a second freewheeling unit having one end connected between the fourth switch element and the fifth switch element, and another end connected to the first output terminal;
   wherein the first switch element and the sixth switch element are turned on and off simultaneously and continuously and the second switch element is turned on during positive half-cycles, and the third switch element and the fourth switch element are turned on and off simultaneously and continuously and the fifth switch element is turned on during negative half-cycles.

2. The inverter according to claim 1 wherein the third switch element, the fourth switch element, and the fifth switch element are turned off during positive half-cycles, and the first switch element, the second switch element, and the sixth switch element are turned off during negative half-cycles.

3. The inverter according to claim 1 further comprising a control unit connected to the first switch element, the second switch element, the third switch element, the fourth switch element, the fifth switch element, and the sixth switch element for controlling switching operations of the first switch element, the second switch element, the third switch element, the fourth switch element, the fifth switch element, and the sixth switch element.

4. The inverter converter according to claim 3 wherein the control unit comprises:
   a first comparator having a positive input terminal for receiving a first sinusoidal signal and a negative input terminal connected to a ground terminal, and an output terminal connected to a control terminal of the second switch element;
   a second comparator having a positive input terminal for receiving the first sinusoidal signal and a negative input terminal for receiving a triangular signal, and an output terminal connected to a control terminal of the first switch element and a control terminal of the sixth switch element;
   a third comparator having a positive input terminal for receiving a second sinusoidal signal and a negative input terminal for receiving the triangular signal, and an output terminal connected to a control terminal of the third switch element and a control terminal of the fourth switch element; and
   a NOT gate having an input terminal connected to the output terminal of the first comparator and an output terminal connected to a control terminal of the fifth switch element.

5. The inverter according to claim 4 wherein the first sinusoidal signal has a phase difference of 180 degree with the second sinusoidal signal.

6. The inverter according to claim 3 wherein the control unit comprises:
   a rectifier for receiving a sinusoidal signal and rectifying the sinusoidal signal into a rectified sinusoidal signal;
   a first comparator having a positive input terminal connected to the rectifier for receiving the rectified sinusoidal signal and a negative input terminal for receiving a triangular signal;
   a second comparator having a positive input terminal for receiving the sinusoidal signal and a negative input terminal connected to a ground terminal, and an output terminal connected to a control terminal of the second switch element;
   a third comparator having a positive input terminal connected to the rectifier for receiving the rectified sinusoidal signal and a negative input terminal for receiving the triangular signal;
   a NOT gate having an input terminal connected to the output terminal of the second comparator and an output terminal connected to a control terminal of the fifth switch element;
   a first AND gate having a first input terminal connected to an output terminal of the first comparator and a second input terminal connected to the output terminal of the second comparator, and an output terminal connected to a control terminal of the first switch element and a control terminal of the sixth switch element; and
   a second AND gate having a first input terminal connected to the output terminal of the NOT gate and a second input terminal connected to an output terminal of the third comparator, and an output terminal connected to a control terminal of the third switch element and a control terminal of the fourth switch element.

7. The inverter according to claim 3 wherein the first freewheeling unit comprises a seventh switch element and the second freewheeling unit comprises an eighth switch element, and wherein the control unit is connected to the seventh switch element and the eighth switch element for controlling switching operations of the seventh switch element and the eighth switch element.

8. The inverter according to claim 7 wherein the control unit is configured to turn off the seventh switch element when the first switch element and the sixth switch element are turned on and turn on the seventh switch element when the first switch element and the sixth switch element are turned off and turn off the eighth switch element during positive half-cycles.

9. The inverter according to claim 8 wherein the control unit is configured to turn off the eighth switch element when the third switch element and the fourth switch element are turned on and turn on the eighth switch element when the third switch element and the fourth switch element are turned off and turn off the seventh switch element during negative half-cycles.

10. The inverter according to claim 7 wherein the seventh switch element and the eighth switch element are configured to operate with a high frequency with a pulse-width modulation fashion.

11. The inverter according to claim 7 wherein the control unit comprises:
 a rectifier for receiving a sinusoidal signal and rectifying the sinusoidal signal into a rectified sinusoidal signal;
 a first comparator having a positive input terminal connected to the rectifier for receiving the rectified sinusoidal signal and a negative input terminal for receiving a triangular signal;
 a second comparator having a positive input terminal for receiving the sinusoidal signal and a negative input terminal connected to a ground terminal, and an output terminal connected to a control terminal of the second switch element;
 a third comparator having a positive input terminal connected to the rectifier for receiving the rectified sinusoidal signal and a negative input terminal for receiving the triangular signal;
 a first NOT gate having an input terminal connected to the output terminal of the second comparator and an output terminal connected to a control terminal of the fifth switch element;
 a first AND gate having a first input terminal connected to an output terminal of the first comparator and a second input terminal connected to the output terminal of the second comparator, and an output terminal connected to a control terminal of the first switch element and a control terminal of the sixth switch element;
 a second AND gate having a first input terminal connected to the output terminal of the first NOT gate and a second input terminal connected to an output terminal of the third comparator, and an output terminal connected to a control terminal of the third switch element and a control terminal of the fourth switch element;
 a second NOT gate having an input terminal connected to the output terminal of the first comparator;
 a third NOT gate having an input terminal connected to the output terminal of the third comparator;
 a third AND gate having a first input terminal connected to an output terminal of the second NOT gate and a second input terminal connected to the output terminal of the second comparator, and an output terminal connected to a control terminal of the seventh switch element; and
 a fourth AND gate having a first input terminal connected to an output terminal of the third NOT gate and a second input terminal connected to the output terminal of the first NOT gate, and an output terminal connected to a control terminal of the eighth switch element.

12. The inverter according to claim 1 wherein the first switch element, the second switch element, the third switch element, the fourth switch element, the fifth switch element, and the sixth switch element are configured to operate with a pulse-width modulation fashion.

13. The inverter according to claim 1 wherein the first switch element, the third switch element, the fourth switch element, and the sixth switch element are configured to turn on or off with a high frequency, and the second switch element and the fifth switch element are configured to turn on or off with a low frequency.

14. The inverter according to claim 1 wherein the inverter is a non-isolated inverter.

15. The inverter according to claim 1 wherein the inverter is applicable to a solar grid-connected photovoltaic system.

16. The inverter according to claim 1 wherein a first relative voltage drop between the first output terminal of the switch circuit and a specific node within the inverter and a second relative voltage drop between the second output terminal of the switch circuit and the specific node are set to maintain their total average value at a constant value.

17. The inverter according to claim 1 wherein the first freewheeling unit comprises a first freewheeling diode having a cathode connected between the first switch element and the second switch element and an anode connected to the second output terminal.

18. The inverter according to claim 1 wherein the second freewheeling unit comprises a second freewheeling diode having a cathode connected between the fourth switch element and the fifth switch element and an anode connected to the first output terminal.

19. The inverter according to claim 1 further comprising:
 an input filter connected to the switch circuit for receiving and filtering a DC input voltage and outputting a rectified DC voltage to the switch circuit; and
 an output filter connected to the switch circuit for removing high-frequency components of the AC modulating voltage, thereby outputting an AC output voltage.

20. The inverter according to claim 1 wherein the first freewheeling unit is configured to provide a freewheeling path between the second output terminal and the first switch element and the second switch element, and the second freewheeling unit is configured to provide another freewheeling path between the first output terminal and the fourth switch element and the fifth switch element.

* * * * *